(12) United States Patent
Tanaka et al.

(10) Patent No.: US 7,175,133 B2
(45) Date of Patent: Feb. 13, 2007

(54) WING DRIVING APPARATUS

(75) Inventors: Teruaki Tanaka, Gifu (JP); Toshio Kamimura, Gifu (JP)

(73) Assignee: TS Corporation, Tokyo (JP)

( * ) Notice: Subject to any disclaimer, the term of this patent is extended or adjusted under 35 U.S.C. 154(b) by 151 days.

(21) Appl. No.: 10/720,927

(22) Filed: Nov. 24, 2003

(65) Prior Publication Data

US 2005/0001090 A1    Jan. 6, 2005

(30) Foreign Application Priority Data

Nov. 27, 2002    (JP)    ............................ P2002-343777

(51) Int. Cl.
*B64C 13/12*    (2006.01)

(52) U.S. Cl. ...................... 244/99.4; 244/99.9; 91/510; 60/403

(58) Field of Classification Search ............... 244/78.1, 244/99.2, 99.4, 99.9, 75.1; 91/508, 509, 91/510; 60/403, 406
See application file for complete search history.

(56) References Cited

U.S. PATENT DOCUMENTS 4,887,214 A * 12/1989 Takats et al. .................. 701/3
5,791,596 A *  8/1998 Gautier et al. ............ 244/76 R
5,806,805 A *  9/1998 Elbert et al. ................. 244/195

FOREIGN PATENT DOCUMENTS

| JP | 47-25898 A | 10/1972 |
| JP | 64-041498 | 2/1989 |
| JP | 10-258750 A | 9/1998 |

OTHER PUBLICATIONS

Notification of Reasons for Rejection from Japanese Patent Office for Japanese Patent Application No. 2002-343777, mailing date: Jul. 19, 2005, 5 pages.

* cited by examiner

*Primary Examiner*—Timothy D. Collins
(74) *Attorney, Agent, or Firm*—Akin Gump Strauss Hauer & Feld, LLP (57) ABSTRACT

A wing driving apparatus is made up of a flight controller part for generating a drive signal, first and second servo actuators, a first controller unit having a first drive circuit, and a second controller unit having a second drive circuit. The first controller unit includes a follower signal generator circuit for generating a follower signal. The second servo actuator includes a solenoid valve for invalidating a control to the second serve actuator based on the drive signal from the second drive circuit in response to the follower signal, whereby the second second servo actuator follows the steering wing when the first drive circuit is able to operate the first servo actuator to drive the steering wing.

2 Claims, 6 Drawing Sheets

WING DRIVING APPARATUS

The present application is based on Japanese Patent Application No. 2002-343777, the entire contents of which are incorporated herein by reference.

BACKGROUND OF THE INVENTION

1. Field of the Invention

The present invention relates to a wing driving apparatus for driving a wing of an airplane.

2. Related Art

There is known a wing driving apparatus for driving the wing in which the wing is driven by all of plural actuators (see JP-A-S64-41498 pp 4 to 7, FIG. 2, for example).

Figure 6:
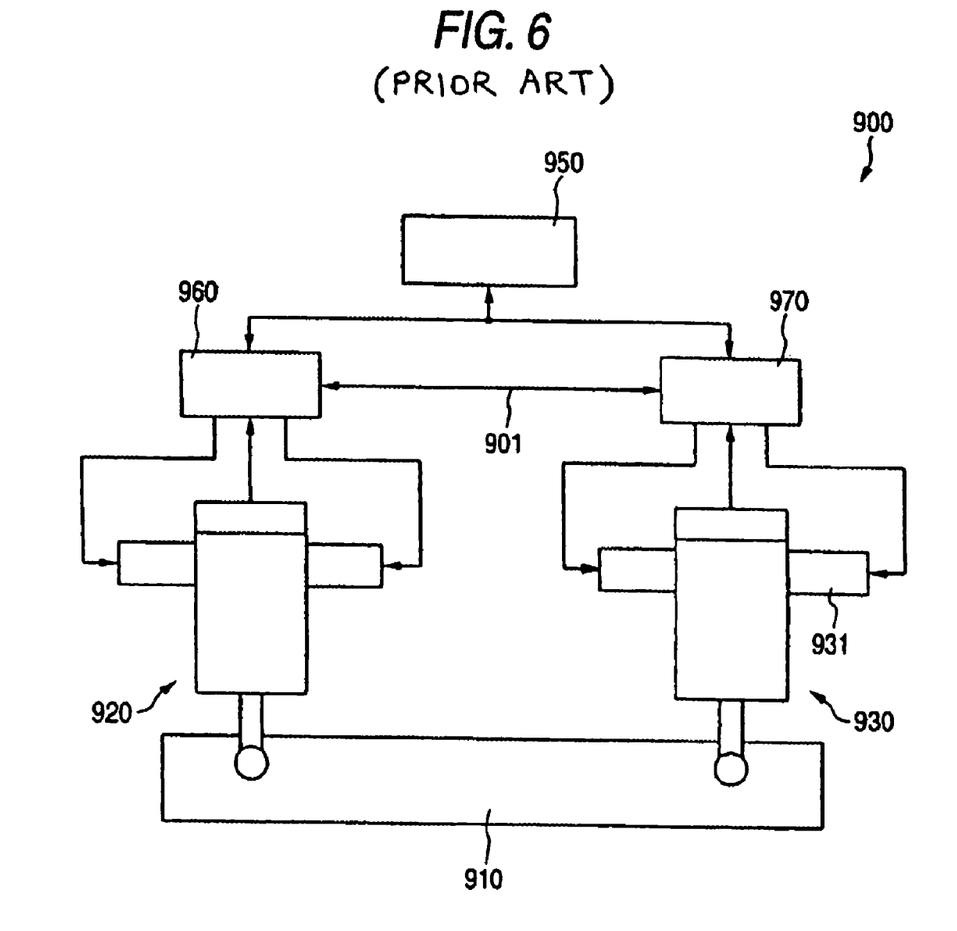
FIG. 6 is a block diagram showing a conventional wing driving apparatus.

Another wing driving apparatus 900 as shown in FIG. 6 is also known. In the wing driving apparatus, the wing is driven by using some of plural actuators. If any of those actuators malfunctions, the wing is uninterruptedly driven by using an actuator having not been used for driving the wing, instead of the malfunctioning one.

The wing driving apparatus 900 is made up of a steering wing 910, servo actuators 920 and 930 for driving the steering wing 910, a flight controller 950 for generating a drive signal for operating the servo actuators 920 and 930 to drive the steering wing 910, and controller 960 and 970 for receiving a drive signal from the flight controller 950.

The controller 960 operates the servo actuator 920 to drive the steering wing 910 in accordance with the drive signal received. When the controller 960 fails to operate the servo actuator 920 to drive the steering wing 910, it sends a signal through an electric wire 901 to the controller 970.

The controller 970 does not supply current to a solenoid valve 931 of the servo actuator 930 till it receives the signal through the electric wire 901 from the controller 960. And, it operates the servo actuator 930 to follow the steering wing 910. When receiving the signal through the electric wire 901 from the controller 960, the controller 970 supplies current to the solenoid valve 931, and operates the servo actuator 930 to drive the steering wing 910 in accordance with a drive signal received.

Thus, the conventional wing driving apparatus 900 changes over the actuator for driving the steering wing 910 from the servo actuator 920 to the servo actuator 930 under control of both the controllers 960 and 970. Accordingly, when the servo actuator 920 is changed over to the servo actuator 930, the controllers 960 and 970 become asynchronous to each other in their operations, and sometimes control of the flight of the airplane is temporarily lost.

In a specific example, after the servo actuator 920 follows the steering wing 910, the servo actuator 930 does not drive the steering wing 910 immediately. Thus, both the servo actuators 920 and 930 follow the steering wing 910, and the flight of the airplane is temporarily uncontrollable.

In addition, the servo actuator 930 drives the steering wing 910 before the servo actuator 920 follows the steering wing 910, and the servo actuators 920 and 930 are put in a state that those drive the steering wing 910. As a result, the flight of the airplane is temporarily uncontrollable, though infrequently.

Furthermore, the wing driving apparatus 900 does not supply current to the solenoid valve 931 of the servo actuator 930 till the controller 970 receives the signal from the controller 960. Accordingly, it is impossible to sufficiently detect a failure in the construction of the servo actuator 930, such as the solenoid valve 931, till the controller 970 receives the signal from the controller 960.

SUMMARY OF THE INVENTION

Accordingly, an object of the present invention is to provide a wing driving apparatus which is capable of improving safety of an airplane in flight.

To achieve the above object, there is provided a wing driving apparatus comprising: a drive signal generator part for generating a drive signal for operating an actuator to drive a wing; a first actuator and a second actuator for driving the wing; a first controller unit including a first drive controller part for controlling the first actuator in accordance with the drive signal so that the first actuator drives the wing; and a second controller unit including a second drive controller part for controlling the second actuator in accordance with the drive signal so that the second actuator drives the wing; wherein the first controller unit includes a follower signal generator part for generating a follower signal, and the second actuator includes a control invalidating part for invalidating a control to the second actuator based on the drive signal from the second drive controller part in response to the follower signal from the follower signal generator part, whereby the second actuator follows the wing when the first drive controller part is able to operate the first actuator to drive the wing.

As described above, the wing driving apparatus of the invention can change over the actuator for driving the wing from one actuator to another actuator through operation of the follower signal generator part of only the first controller unit, not through operations of both the first controller unit and the second controller unit. This feature ensures smoothly switching over of the actuator for driving the wing. Accordingly, improved safety of the airplane in flight is secured.

In a predetermined embodiment of the invention, the wing driving apparatus further includes a detector part for detecting as to whether or not the second drive controller part is able to operate the second actuator to drive the wing when the first drive controller part operates the first actuator to drive the wing.

With such an arrangement, the wing driving apparatus of the invention can detect, in advance, as to whether or not the second controller unit is able to operate the second actuator to drive the wing. Accordingly, the wing driving apparatus can improve safety of the airplane in flight when comparing with the wing driving apparatus not having the detector part.

DETAILED DESCRIPTION OF THE PREFERRED EMBODIMENTS

The preferred embodiments of the invention will be described with reference to the accompanying drawings.

<First Embodiment>

A system configuration of a wing driving apparatus which is an embodiment of the present invention will be described.

Figure 1:
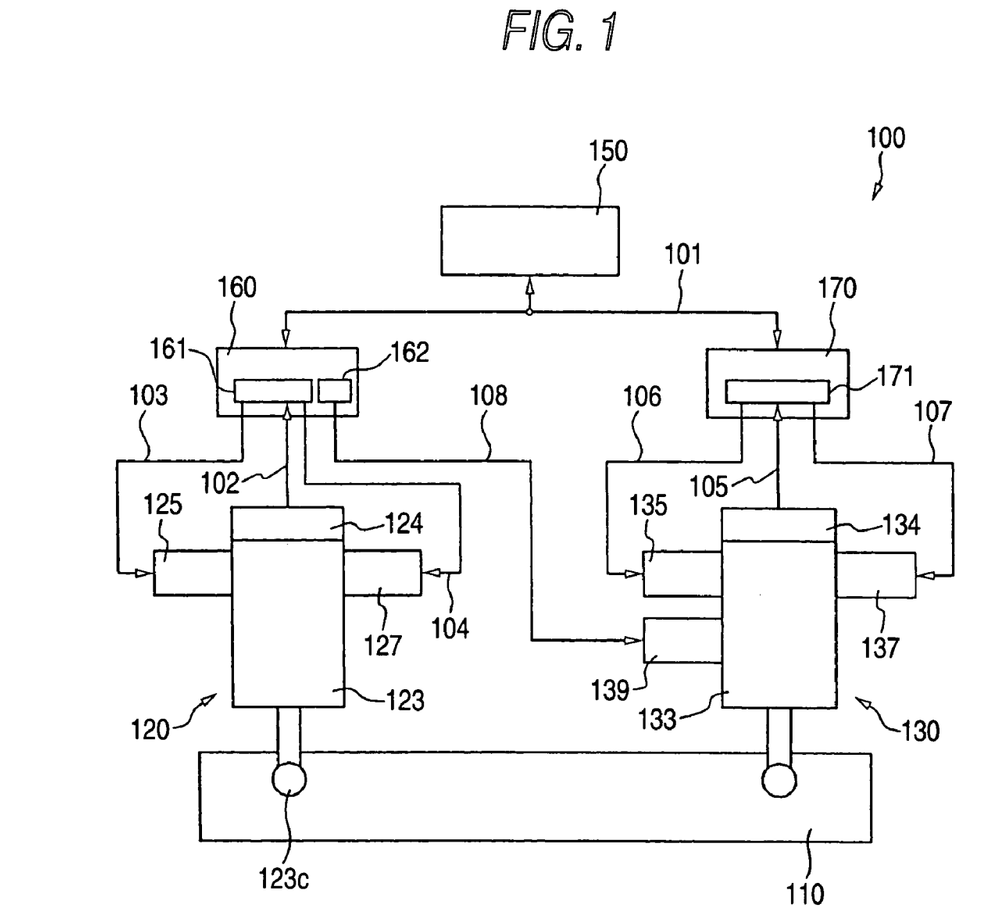
FIG. 1 is a block diagram showing a wing driving apparatus which is a first embodiment of the invention.

As shown in FIG. 1, a wing driving apparatus 100 which is an embodiment of the present invention is comprised of a steering wing 110, a servo actuator 120 as a main actuator for driving the steering 110, a servo actuator 130 as a sub-actuator for driving the steering wing 110, and a flight controller 150 as a drive signal generator part for generating a drive signal which operates the servo actuator 120 and the servo actuator 130 to drive the steering wing 110.

The wing driving apparatus 100 includes a controller 160 as a main controller unit which receives a drive signal from the flight controller 150 via an electric wire 101. The controller 160 includes a drive circuit 161 as a main drive controller part and a follower signal generator circuit 162 as a follower signal generator part. The drive circuit 161 operates the servo actuator 120 to drive the steering wing 110 in accordance with the input drive signal. The follower signal generator circuit 162 generates a follower signal which operates the servo actuator 130 to follow the steering wing 110 when the drive circuit 161 is able to operate the servo actuator 120 to drive the steering wing 110.

The wing driving apparatus 100 includes a controller 170 as a sub-controller unit which receives a drive signal from the flight controller 150 via the electric wire 110. The controller 170 includes a drive circuit 171 as a sub-drive controller part. The drive circuit 171 operates the servo actuator 130 to drive the steering wing 110 in accordance with the input drive signal.

Figure 2:
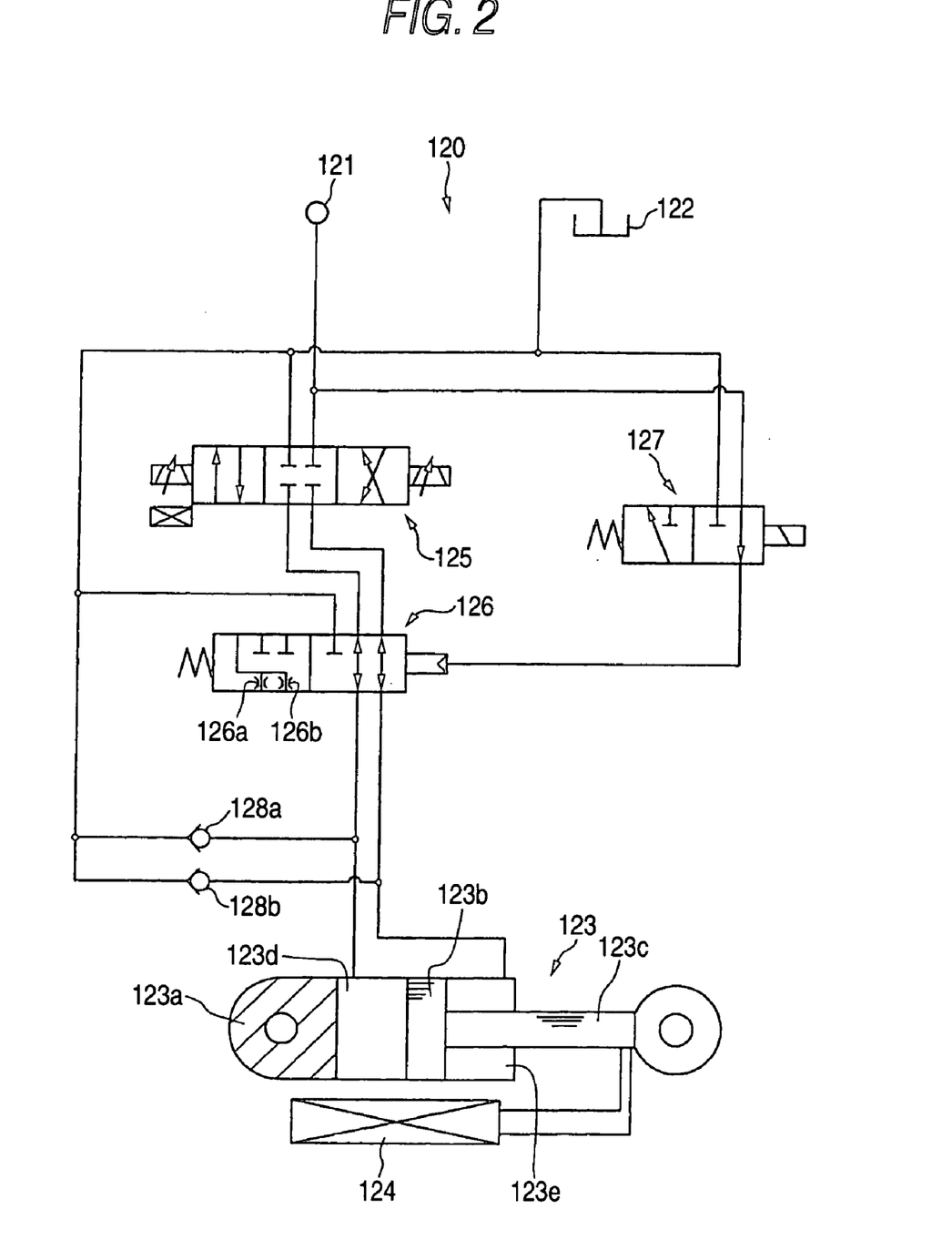
FIG. 2 is a hydraulic circuit diagram showing a servo actuator for the wing driving apparatus shown in FIG. 1.

The servo actuator 120, as shown in FIG. 2, includes a supply port 121 communicating with a pump (not shown) and a tank 122.

The servo actuator 120 contains a hydraulic cylinder 123. The hydraulic cylinder 123 includes a cylinder tube 123a, one end of which is slidably coupled to a part of an airplane (not shown), a piston 123b being movable within the cylinder tube 123a, and a piston rod 123c which has one end coupled to the piston 123b and the other end protruding outward from the other end of the cylinder tube 123a, and is slidably coupled to the steering wing 110 (see FIG. 1). The hydraulic cylinder 123 further includes a cylinder chamber 123d and a cylinder chamber 123e.

The servo actuator 120 further includes a position sensor 124. The position sensor 124 detects a position of the piston 123b relative to the cylinder tube 123a, and outputs a detect signal representative of a detected position for transmission to the drive circuit 161 (FIG. 1) of the controller 160 (FIG. 1) by way of an electric wire 102. (FIG. 1).

The servo actuator 120 includes an electro-hydraulic controlled valve 125 which receives a control signal from the drive circuit 161 of the controller 160 via an electric wire 103 (FIG. 1), and controls pressure of oil in the cylinder chamber 123d and the cylinder chamber 123e by changing a state of communication among the supply port 121, the tank 122, and the cylinder chamber 123d and the cylinder chamber 123e of the hydraulic cylinder 123 in accordance with an input control signal.

The servo actuator 120 includes a mode switching valve 126 which includes an orifice 126a and an orifice 126b. The mode switching valve 126 selects a drive mode or a follower mode. In the drive mode, the electro-hydraulic controlled valve 125 communicates with the hydraulic cylinder 123 to operate the hydraulic cylinder 123 to drive the steering wing 110. In the follower mode, the tank 122 communicates with the hydraulic cylinder 123 by way of the orifice 126a and the orifice 126b, whereby the hydraulic cylinder 123 follows the steering wing 110.

The servo actuator 120 further includes a solenoid valve 127 which is fed with current by the drive circuit 161 of the controller 160 via an electric wire 104 (FIG. 1). When fed with current, the solenoid valve 127 allows the supply port 121 to communicate with the mode switching valve 126. When not fed with current, the solenoid valve 127 allows the tank 122 to communicate with the mode switching valve 126.

The mode switching valve 126 selects the drive mode when it is communicatively connected to the supply port 121 by the solenoid valve 127. The mode switching valve 126 selects the follower mode when it is communicatively connected to the tank 122 by the solenoid valve 127.

The servo actuator 120 includes a check valve 128a and a check valve 128b. The check valve 128a allows oil to flow from the tank 122 to the cylinder chamber 123d of the hydraulic cylinder 123 to thereby prevent the counter flow of oil. The check valve 128b allows oil to flow from the tank 122 to the cylinder chamber 123e of the hydraulic cylinder 123 to thereby prevent the counter flow of oil.

When the servo actuator 120 follows the steering wing 110, the servo actuator 120 allows oil to flow from the cylinder chamber 123d or the cylinder chamber 123e to the tank 122, while throttling the flow rate of oil by the orifice 126a or the orifice 126b, and further allows oil to flow from the tank 122 to the cylinder chamber 123d or 123e by way of the check valve 128a or 128b, whereby generation of a cavitation in the actuator is prevented.

Figure 3:
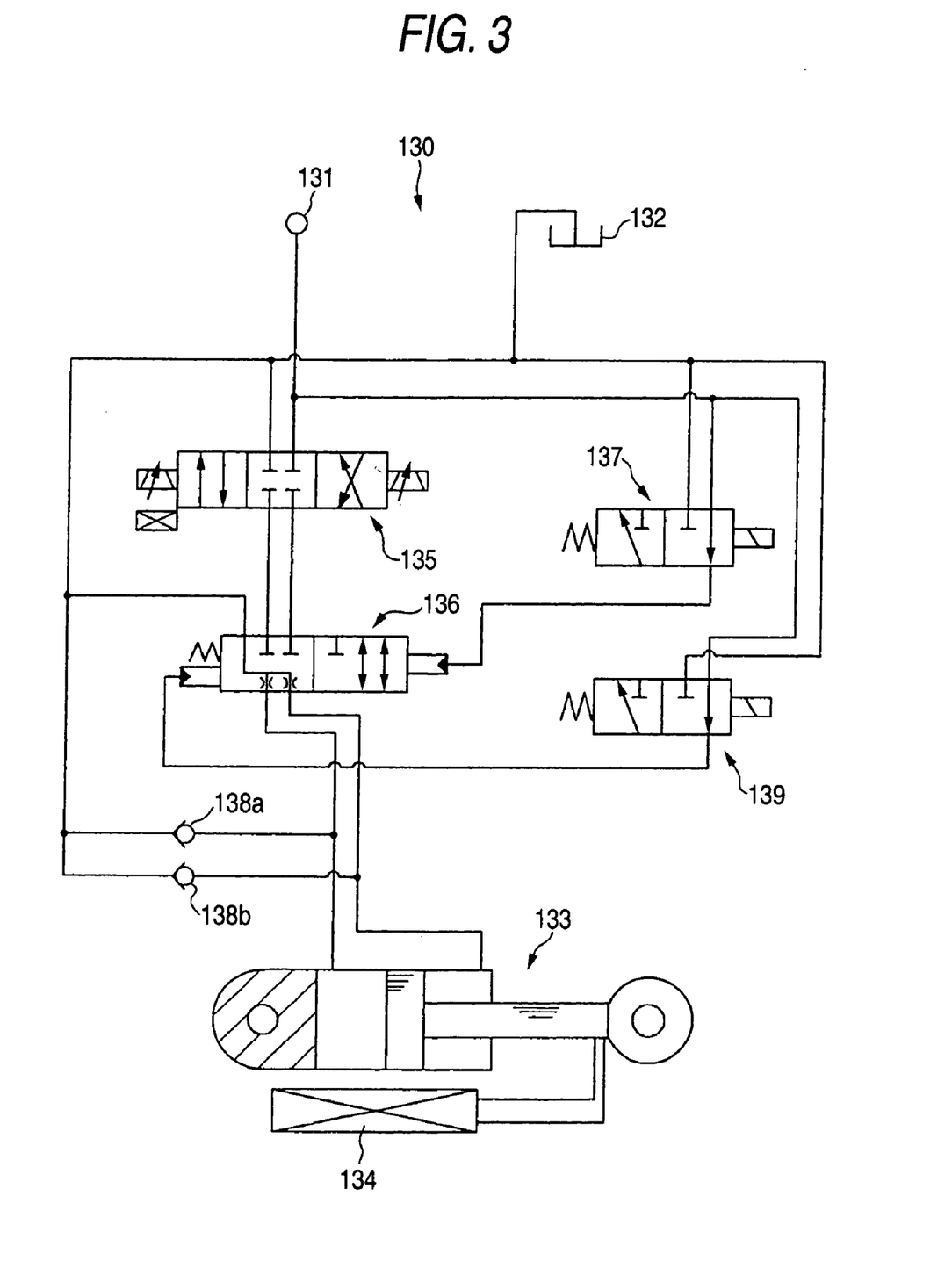
FIG. 3 is a hydraulic circuit diagram showing a servo actuator for the wing driving apparatus of FIG. 1, which is different from that shown in FIG. 2.

The servo actuator 130, as shown in FIG. 3, includes a supply port 131, a tank 132, a hydraulic cylinder 133, a position sensor 134, an electro-hydraulic controlled valve 135, a mode switching valve 136, a solenoid valve 137, a check valve 138a, and a check valve 138b, which resemble respectively the supply port 121, the tank 122, the hydraulic cylinder 123, the position sensor 124, the electro-hydraulic controlled valve 125, the mode switching valve 126, the solenoid valve 127, the check valve 128a and the check valve 128b in the servo actuator 120 shown in FIG. 2.

The position sensor 134 outputs a detect signal to the drive circuit 171 (FIG. 1) of the controller 170 (FIG. 1) by way of an electric wire 105 (FIG. 1). The electro-hydraulic controlled valve 135 receives a control signal from the drive circuit 171 by way of an electric wire 106 (FIG. 1). Current is fed from the drive circuit 171 to the solenoid valve 137 by way of an electric wire 107 (FIG. 1).

The servo actuator 130 includes a solenoid valve 139 to which current as a follower signal is fed from the follower signal generator circuit 162 of the controller 160 via an electric wire 108 (FIG. 1). When fed with current, the solenoid valve 139 allows the supply port 131 to communicate with the mode switching valve 136. When not fed with current, the solenoid valve 139 allows the tank 132 to communicate with the mode switching valve 136.

When the mode switching valve 136 is communicatively connected to the supply port 131 by the solenoid valve 139, or the mode switching valve 136 is communicatively connected to the tank 132 by both the solenoid valve 139 and the solenoid valve 137, the mode switching valve 136 selects the follower mode in which the hydraulic cylinder 133 follows the steering wing 110. When the mode switching valve 136 is communicatively connected to the tank 132 by the solenoid valve 139 and is communicatively connected to the supply port 131 by the solenoid valve 137, the mode switching valve 136 selects the drive mode in which the hydraulic cylinder 133 drives the steering wing 110.

As described above, the mode switching valve 136 and the solenoid valve 139 form a control invalidating part for invalidating the control of the servo actuator 130 by the drive circuit 171 in accordance with the follower signal.

Also when the drive circuit 161 is able to operate the servo actuator 120 to drive the steering wing 110, the drive circuit 171 supplies current to the solenoid valve 137. Accordingly, the flight controller 150 detects when the drive circuit 161 is able to operate the servo actuator 120 to drive the steering wing 110 by detecting as to whether or not the drive circuit 171 is able to operate the servo actuator 130 to drive the steering wing 110 or whether or not the solenoid valve 137 malfunctions. In this sense, the flight controller 150 forms a detector part.

Operation of the wing driving apparatus thus constructed will be described.

An operation mode in which the drive circuit 161 is able to operate the servo actuator 120 to drive the steering wing 110 will first be described.

The flight controller 150 generates a drive signal and supplies it to the controllers 160 and 170 via the electric wire 101.

When a drive signal is input to the controller 160, the drive circuit 161 of the controller 160 feeds current to the solenoid valve 127 via the electric wire 104. In turn, the solenoid valve 127 communicatively connects the supply port 121 to the mode switching valve 126. When the solenoid valve 127 communicatively connects the supply port 121 to the mode switching valve 126, the mode switching valve 126 selects the drive mode.

Accordingly, the drive circuit 161 of the controller 160 receives a drive signal and a detect signal which comes through the electric wire 102 from the position sensor 124, and generates a control signal based on those received signals. The generated control signal is applied through the electric wire 103 to the electro-hydraulic controlled valve 125. In turn, the electro-hydraulic controlled valve 125 allows the servo actuator 120 to drive the steering wing 110.

Since the drive circuit 161 is able to operate the servo actuator 120 to drive the steering wing 110, the follower signal generator circuit 162 of the controller 160 generates a follower signal, and supplies it through the electric wire 108 to the solenoid valve 139 of the servo actuator 130.

When the drive signal is input to the controller 170, the drive circuit 171 of the controller 170 supplies current through the electric wire 107 to the solenoid valve 137 of the servo actuator 130. Accordingly, the solenoid valve 137 communicatively connects the supply port 131 to the mode switching valve 136. Even when the solenoid valve 137 communicatively connects the supply port 131 to the mode switching valve 136, the follower signal generator circuit 162 of the controller 160 supplies current as a follower signal to the solenoid valve 139, so that the supply port 131 is communicatively connected to the mode switching valve 136. As a result, the mode switching valve 136 selects the follower mode.

In the follower mode, the drive circuit 171 of the controller 170 receives an input drive signal and a signal which comes through the electric wire 105 from the position sensor 134, and generates a control signal based on those received signals, and supplies the control signal to the electro-hydraulic controlled valve 135 via the electric wire 106. However, the servo actuator 130 follows the steering wing 110.

Next, description will be given about a case where the drive circuit 171 is able to operate the servo actuator 130 to drive the steering wing 110 and drive signals are input to the controllers 160 and 170, and the drive circuit 161 becomes unable to operate the servo actuator 120 to drive the steering wing 110.

When the drive signal is input to the controller 170, the drive circuit 171 of the controller 170 feeds current through the electric wire 107 to the solenoid valve 137 of the servo actuator 130. Accordingly, the solenoid valve 137 communicatively connects the supply port 131 to the mode switching valve 136.

When the drive circuit 161 of the controller 160 becomes unable to operate the servo actuator 120 to drive the steering wing 110, it does not feed current through the electric wire 104 to the solenoid valve 127, and does not feed current as a follower signal to the solenoid valve 139 via the electric wire 108.

When no current is fed from the drive circuit 161 through the electric wire 104 to the solenoid valve 127, the solenoid valve 127 communicatively connects the tank 122 to the mode switching valve 126, and the mode switching valve 126 selects the follower mode.

In this mode, the servo actuator 120 follows the steering wing 110.

When no current is fed from the drive circuit 162 to the solenoid valve 139 via the electric wire 108, the solenoid valve 139 communicatively connects the tank 132 to the mode switching valve 136. At this time, the solenoid valve 137 has communicatively connected the supply port 131 to the mode switching valve 136. Therefore, the mode switching valve 136 selects the drive mode.

When the drive signal is input to the controller 170, the drive circuit 171 of the controller 170, as described above, generates a control signal by use of an input drive signal and a detect signal which comes through the electric wire 105 from the position sensor 134, and supplies the control signal through the electric wire 106 to the electro-hydraulic controlled valve 135.

Accordingly, when the drive circuit 161 of the controller 160 becomes unable to operate the servo actuator 120 to drive the steering wing 110, the drive circuit 171 of the controller 170 is able to operate the servo actuator 130 to drive the steering wing 110.

As described above, the wing driving apparatus 100 can change over the actuator for driving the steering wing 110 from the servo actuator 120 to the servo actuator 130 through operation of the follower signal generator circuit 162 of only the controller 160, not through operations of both the controllers 160 and 170. This feature ensures smoothly switching over of the actuator for driving the steering wing 110. Accordingly, improved safety of the airplane (not shown) in flight is secured.

The flight controller 150 can detect, in advance, as to whether or not the drive circuit 171 is able to operate the servo actuator 130 to drive the steering wing 110 when the servo actuator 120 is actuating the steering wing 110. Accordingly, the wing driving apparatus 100 can improve safety of the airplane (not shown) in flight when comparing with the flight controller which cannot detect, in advance, as to whether or not the drive circuit 171 is able to operate the servo actuator 130 to drive the steering wing 110.

The wing driving apparatus 100, in the instant embodiment, uses an electric signal for the signal. An optical signal may be used in place of the electrical signal if the electric wires 101 to 108 are substituted by optical cables.

<Second Embodiment>

A system configuration of a wing driving apparatus which is a second embodiment of the invention will be described.

Figure 4:
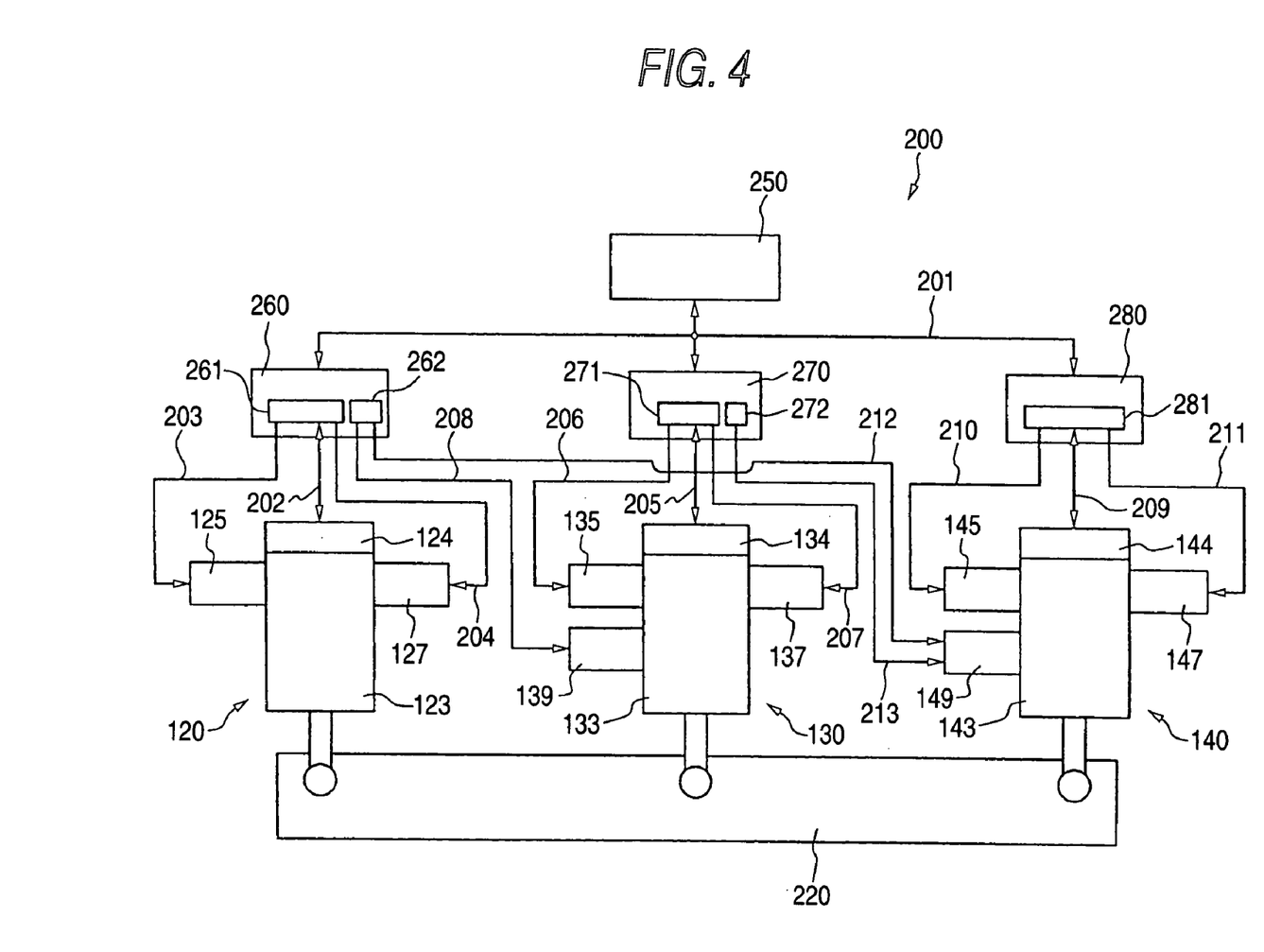
FIG. 4 is a block diagram showing a wing driving apparatus which is a second embodiment of the invention.

As shown in FIG. 4, a wing driving apparatus 200 of the instant embodiment is comprised of a steering wing 220, a servo actuator 120 (see FIG. 2) for driving the steering wing 220, a servo actuator 130 (FIG. 3) and a servo actuator 140, both being for driving the steering wing 220, a flight controller 250 as a drive signal generator part for generating a drive signal for operating the servo actuators 120, 130 and 140 to drive the steering wing 220.

The wing driving apparatus 200 includes a controller 260 which receives a drive signal through an electric wire 201 from the flight controller 250. The controller 260 includes a drive circuit 261 for operating the servo actuator 120 to drive the steering wing 220 in accordance with a drive signal received, and a follower signal generator circuit 262 for generating a follower signal which operates the servo actuators 130 and 140 to follow the steering wing 220 when the drive circuit 261 is able to operate the servo actuator 120 to drive the steering wing 220.

The wing driving apparatus 200 includes a controller 270 which receives a drive signal through an electric wire 201 from the flight controller 250. The controller 270 includes a drive circuit 271 for operating the servo actuator 130 to drive the steering wing 220 in accordance with a drive signal received, and a follower signal generator circuit 272 for generating a follower signal which operates the servo actuator 140 to follow the steering wing 220 when the drive circuit 271 is able to operate the servo actuator 130 to drive the steering wing 220.

The wing driving apparatus 200 includes a controller 280 which receives a drive signal through an electric wire 201 from the flight controller 250. The controller 280 includes a drive circuit 281 for operating the servo actuator 140 to drive the steering wing 220 in accordance with a drive signal received, A position sensor 124 of the servo actuator 120 outputs a detect signal through an electric wire 202 to the drive circuit 261 of the controller 260. An electro-hydraulic controlled valve 125 receives a control signal through an electric wire 203 from the drive circuit 261. A solenoid valve 127 is fed with current through an electric wire 204 by the drive circuit 261.

A position sensor 134 of the servo actuator 130 outputs a detect signal through an electric wire 205 to the drive circuit 271 of the controller 270. An electro-hydraulic controlled valve 135 receives a control signal through an electric wire 206 from the drive circuit 271. A solenoid valve 137 is fed with current through an electric wire 207 by the drive circuit 271. A solenoid valve 139 is fed with current through an electric wire 208 by the follower signal generator circuit 262 of the controller 260.

Figure 5:
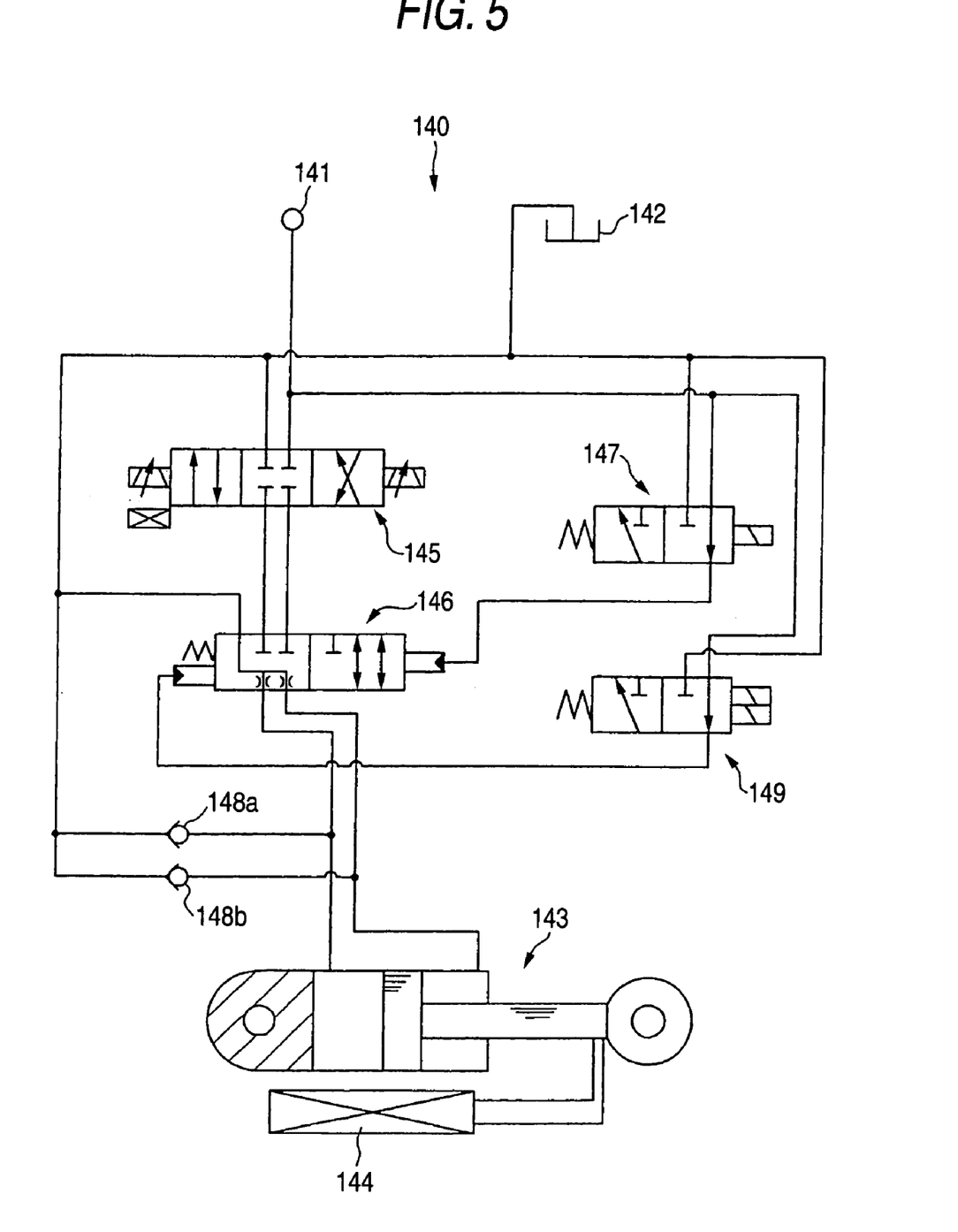
FIG. 5 is a hydraulic circuit diagram showing a servo actuator for the wing driving apparatus shown in FIG. 4.

The servo actuator 140, as shown in FIG. 5, includes a supply port 141, a tank 142, a hydraulic cylinder 143, a position sensor 144, an electro-hydraulic controlled valve 145, a mode switching valve 146, a solenoid valve 147, a check valve 148a, a check valve 148b, and a solenoid valve 149, which resemble respectively a supply port 131 of the servo actuator 130, a tank 132, a hydraulic cylinder 133, a position sensor 134, an electro-hydraulic controlled valve 135, a mode switching valve 136, a solenoid valve 137, a check valve 138a, a check valve 138b, and a solenoid valve 139, which are shown in FIG. 3.

The position sensor 144 outputs a detect signal to the drive circuit 281 (FIG. 4) of the controller 280 (FIG. 4) by way of an electric wire 209 (FIG. 4). The electro-hydraulic controlled valve 145 receives a control signal from the drive circuit 281 by way of an electric wire 210 (FIG. 4). Current is fed from the drive circuit 281 to the solenoid valve 147 by way of an electric wire 211 (FIG. 4).

The solenoid valve 149 receives current as a follower signal from the follower signal generator circuit 262 of the controller 260 via an electric wire 212 (FIG. 4), and current as a follower signal from the follower signal generator circuit 272 of the controller 270 via an electric wire 213 (FIG. 4). When fed with current, the solenoid valve 149 allows the supply port 141 to communicate with the mode switching valve 146. When not fed with current, the solenoid valve 149 allows the tank 142 to communicate with the mode switching valve 146.

As described above, the mode switching valve 136 and the solenoid valve 139 form a control invalidating part for invalidating the control of the servo actuator 130 by the drive circuit 271 according to the follower signal. Similarly, the mode switching valve 146 and the solenoid valve 149 form a control invalidating part for invalidating the control of the servo actuator 140 by the drive circuit 281 according to the follower signal.

When the drive circuit 261 is able to operate the servo actuator 120 to drive the steering wing 220, the following system components function as follows: The servo actuator 120 functions as a main actuator; the servo actuators 130 and 140, as sub-actuators; the controller 260, as a main controller unit; the controllers 270 and 280, as sub-controller units; the drive circuit 261, as a main drive controller part; the drive circuits 271 and 272, as sub-drive controller parts; and the follower signal generator circuit 262, as a follower signal generator part.

When the drive circuit 261 is unable to operate the servo actuator 120 to drive the steering wing 220, and the drive circuit 271 is able to operate the servo actuator 130 to drive the steering wing 220, the following system components function as follows: The servo actuator 130 serves as a main actuator; the servo actuator 140, as a sub-actuator; the controller 270, as a main controller unit; the controller 280, as a sub-controller unit; the drive circuit 271, as a main controller unit; the drive circuit 281, as a sub-drive controller part; and the follower signal generator circuit 272, as a follower signal generator part.

Also when the drive circuit 261 is able to operate the servo actuator 120 to drive the steering wing 220, the drive circuit 271 supplies current to the solenoid valve 137. Accordingly, the flight controller 250 detects when the drive circuit 261 is able to operate the servo actuator 120 to drive the steering wing 220 by detecting as to whether or not the drive circuit 271 is able to operate the servo actuator 130 to drive the steering wing 220 or whether or not the solenoid valve 137 malfunctions. In this sense, the flight controller 250 forms a detector part. Further, when the drive circuit 261 is able to operate the servo actuator 120 to drive the steering wing 220, and when the drive circuit 271 is able to operate the servo actuator 130 to drive the steering wing 220, the drive circuit 281 supplies current to the solenoid valve 147. Accordingly, the flight controller 250 detects when the drive circuit 261 is able to operate the servo actuator 120 to drive the steering wing 220 or when the drive circuit 271 operates the servo actuator 130 to drive the steering wing 220 by detecting as to whether or not the drive circuit 281 is able to operate the servo actuator 140 to drive the steering wing 220 or whether or not the solenoid valve 147 malfunctions. In this sense, the flight controller 250 forms a detector part.

Operation of the wing driving apparatus thus constructed will be described.

An operation mode in which the drive circuit 261 is able to operate the servo actuator 120 to drive the steering wing 220 will first be described.

The flight controller 250 generates a drive signal and supplies it to the controllers 260, 270 and 280 via the electric wire 201.

When a drive signal is input to the controller 260, the drive circuit 261 of the controller 260 feeds current to the solenoid valve 127 via the electric wire 204. In turn, the solenoid valve 127 communicatively connects the supply port 121 to the mode switching valve 126. When the solenoid valve 127 communicatively connects the supply port 121 to the mode switching valve 126, the mode switching valve 126 selects the drive mode.

Accordingly, the drive circuit 261 of the controller 260 receives a drive signal and a detect signal which comes through the electric wire 202 from the position sensor 124, and generates a control signal based on those received signals. The generated control signal is applied through the electric wire 203 to the electro-hydraulic controlled valve 125. In turn, the electro-hydraulic controlled valve 125 allows the servo actuator 120 to drive the steering wing 220.

Since the drive circuit 261 is able to operate the servo actuator 120 to drive the steering wing 220, the follower signal generator circuit 262 of the controller 260 generates a follower signal, and supplies it through the electric wire 208 to the solenoid valve 139 of the servo actuator 130, and through the electric wire 212 to the solenoid valve 149 of the servo actuator 140.

When the drive signal is input to the controller 270, the drive circuit 271 of the controller 270 supplies current through the electric wire 207 to the solenoid valve 137 of the servo actuator 130. Accordingly, the solenoid valve 137 communicatively connects the supply port 131 to the mode switching valve 136. Even when the solenoid valve 137 communicatively connects the supply port 131 to the mode switching valve 136, the follower signal generator circuit 262 of the controller 260 supplies current as a follower signal to the solenoid valve 139, so that the supply port 131 is communicatively connected to the mode switching valve 136. As a result, the mode switching valve 136 selects the follower mode.

In the follower mode, the drive circuit 271 of the controller 270 receives an input drive signal and a signal which comes through the electric wire 205 from the position sensor 134, and generates a control signal based on those received signals, and supplies the control signal to the electro-hydraulic controlled valve 135 via the electric wire 206. However, the servo actuator 130 follows the steering wing 220.

When a drive signal is input to the controller 280, the drive circuit 281 of the controller 280 supplies current to the solenoid valve 147 of the servo actuator 140, via the electric wire 211. In turn, the solenoid valve 147 communicatively connects the supply port 141 to the mode switching valve 146. Even when the solenoid valve 147 communicatively connects the supply port 141 to the mode switching valve 146, current as a follower signal is fed to the solenoid valve 149, from the follower signal generator circuit 262 of the controller 260. Accordingly, the supply port 141 is communicatively connected to the mode switching valve 146, and the mode switching valve 146 selects a follower mode.

Accordingly, the drive circuit 281 of the controller 280 receives a drive signal and a detect signal which comes through the electric wire 209 from the position sensor 144, and generates a control signal based on those received signals. The generated control signal is applied through the electric wire 210 to the electro-hydraulic controlled valve 145. However, the servo actuator 140 follows the steering wing 220.

Next, description will be given about a case where the drive circuit 271 is able to operate the servo actuator 130 to drive the steering wing 220 and drive signals are input to the controllers 260, 270 and 280, and the drive circuit 261 becomes unable to operate the servo actuator 120 to drive the steering wing 220.

When the drive signal is input to the controller 270, the drive circuit 271 of the controller 270 feeds current through the electric wire 207 to the solenoid valve 137 of the servo actuator 130. Accordingly, the solenoid valve 137 communicatively connects the supply port 131 to the mode switching valve 136.

When the drive circuit 261 of the controller 260 becomes unable to operate the servo actuator 120 to drive the steering wing 220, it does not feed current through the electric wire 204 to the solenoid valve 127, and does not feed current as a follower signal to the solenoid valve 139 via the electric wire 208. Further, it does not feed current as a follower signal to the solenoid valve 149.

When no current is fed from the drive circuit 261 through the electric wire 204 to the solenoid valve 127, the solenoid valve 127 communicatively connects the tank 122 to the mode switching valve 126, and the mode switching valve 126 selects the follower mode.

In this mode, the servo actuator 120 follows the steering wing 220.

When no current is fed from the drive circuit 261 to the solenoid valve 139 via the electric wire 208, the solenoid valve 139 communicatively connects the tank 132 to the mode switching valve 136. At this time, the solenoid valve 137 has communicatively connected the supply port 131 to the mode switching valve 136. Therefore, the mode switching valve 136 selects the drive mode.

When the drive signal is input to the controller 270, the drive circuit 271 of the controller 270, as described above, generates a control signal by use of an input drive signal and a detect signal which comes through the electric wire 205 from the position sensor 134, and supplies the control signal through the electric wire 206 to the electro-hydraulic controlled valve 135.

Accordingly, when the drive circuit 261 of the controller 260 becomes unable to operate the servo actuator 120 to drive the steering wing 220, the drive circuit 271 of the controller 270 is able to operate the servo actuator 130 to drive the steering wing 220.

Since the drive circuit 171 is able to operate the servo actuator 130 to drive the steering wing 220, the follower signal generator circuit 272 of the controller 270 generates a follower signal, and supplies it through the electric wire 213 to the solenoid valve 149 of the servo actuator 140.

When the drive signal is input to the controller 280, the drive circuit 281 of the controller 280 supplies current through the electric wire 211 to the solenoid valve 147 of the servo actuator 140. Accordingly, the solenoid valve 147 communicatively connects the supply port 141 to the mode switching valve 146. Even when the solenoid valve 147 communicatively connects the supply port 141 to the mode switching valve 146, the follower signal generator circuit 272 of the controller 270 supplies current as a follower signal to the solenoid valve 149, so that the supply port 141 is communicatively connected to the mode switching valve 146. As a result, the mode switching valve 146 selects the follower mode.

In the follower mode, the drive circuit 281 of the controller 280 receives an input drive signal and a signal which comes through the electric wire 209 from the position sensor 144, and generates a control signal based on those received signals, and supplies the control signal to the electro-hydraulic controlled valve 145 via the electric wire 210. However, the servo actuator 140 follows the steering wing 220.

Next, description will be given about a case where the drive circuit 281 is able to operate the servo actuator 140 to drive the steering wing 220 and drive signals are input to the controllers 270 and 280, and the drive circuits 261 and 271 become respectively unable to operate the servo actuators 120 and 130 to drive the steering wing 220.

When the drive signal is input to the controller 280, the drive circuit 281 of the controller 280 feeds current through the electric wire 211 to the solenoid valve 147 of the servo actuator 140. Accordingly, the solenoid valve 147 communicatively connects the supply port 141 to the mode switching valve 146.

When the drive circuit 261 of the controller 260 becomes unable to operate the servo actuator 120 to drive the steering wing 220, it does not feed current through the electric wire 204 to the solenoid valve 127, does not feed current as a follower signal to the solenoid valve 139 via the electric wire 208, and does not feed current as a follower signal to the solenoid valve 149.

When no current is fed from the drive circuit 261 through the electric wire 204 to the solenoid valve 127, the solenoid valve 127 communicatively connects the tank 122 to the mode switching valve 126, and the mode switching valve 126 selects the follower mode.

In this mode, the servo actuator 120 follows the steering wing 220.

When the drive circuit 271 of the controller 270 becomes unable to operate the servo actuator 130 to drive the steering wing 220, it does not feed current through the electric wire 207 to the solenoid valve 137, and does not feed current as a follower signal to the solenoid valve 149 via the electric wire 213.

When no current is fed from the drive circuit 271 through the electric wire 207 to the solenoid valve 137, the solenoid valve 137 communicatively connects the tank 132 to the mode switching valve 136, and the mode switching valve 136 selects the follower mode.

In this mode, the servo actuator 130 follows the steering wing 220.

When no current is fed from the drive circuit 261 and the drive circuit 271 to the solenoid valve 149 via the electric wires 212 and 213, the solenoid valve 149 communicatively connects the tank 142 to the mode switching valve 146. At this time, the solenoid valve 147 has communicatively connected the supply port 141 to the mode switching valve 146. Therefore, the mode switching valve 146 selects the drive mode.

When the drive signal is input to the controller 280, the drive circuit 281 of the controller 280, as described above, generates a control signal by use of an input drive signal and a detect signal which comes through the electric wire 209 from the position sensor 144, and supplies the control signal through the electric wire 210 to the electro-hydraulic controlled valve 145.

Accordingly, when the drive circuit 261 and the drive circuit 271 become unable to operate the servo actuators 120 and 130 to drive the steering wing 220, the drive circuit 281 of the controller 280 is able to operate the servo actuator 140 to drive the steering wing 220.

As described above, the wing driving apparatus 200 can change over the actuator for driving the steering wing 220 from the servo actuator 120 to the servo actuator 130 through operation of the follower signal generator circuit 262 of only the controller 260, not through operations of both the controllers 260 and 270. This feature ensures smoothly switching over of the actuator for driving the steering wing 220. Accordingly, improved safety of the airplane (not shown) in flight is secured.

Similarly, the wing driving apparatus 200 can change over the actuator for driving the steering wing 220 from the servo actuator 130 to the servo actuator 140 through operation of the follower signal generator circuit 272 of only the controller 270, not through operations of both the controllers 270 and 280. This feature ensures smoothly switching over of the actuator for driving the steering wing 220. Accordingly, improved safety of the airplane (not shown) in flight is secured.

The flight controller 250 can detect, in advance, as to whether or not the drive circuit 271 is able to operate the servo actuator 130 to drive the steering wing 220 when the servo actuator 120 is actuating the steering wing 220. Accordingly, the wing driving apparatus 250 can improve safety of the airplane (not shown) in flight when comparing with the flight controller 250 which cannot detect, in advance, as to whether or not the drive circuit 271 is able to operate the servo actuator 130 to drive the steering wing 220.

The flight controller 250 can detect, in advance, as to whether or not the drive circuit 281 is able to operate the servo actuator 140 to drive the steering wing 220 when the servo actuator 130 is actuating the steering wing 220. Accordingly, the wing driving apparatus 250 can improve safety of the airplane (not shown) in flight when comparing with the flight controller 250 which cannot detect, in advance, as to whether or not the drive circuit 281 is able to operate the servo actuator 140 to drive the steering wing 220.

The wing driving apparatus 200, in the instant embodiment, uses an electric signal for the signal. An optical signal may be used in place of the electrical signal if the electric wires 201 to 213 are substituted by optical cables.

As seen from the foregoing description, the present invention successfully provides a wing driving apparatus which is capable of improving safety of an airplane in flight.

What is claimed is:

1. A wing driving apparatus comprising:
   (a) a first actuator and a second actuator coupled to a wing;
   (b) a first controller unit for controlling the first actuator;
   (c) a second controller unit for controlling the second actuator, and
   (d) a drive signal generator part (150, 250) which generates a drive signal for driving the wing and sending the drive signal to the first and second control unit, wherein
   the first controller unit includes a first drive controller part for controlling the first actuator in accordance with the drive signal,
   the second controller unit includes a second drive controller part for controlling the second actuator in accordance with the drive signal,
   the first actuator including a first controlled valve for controlling a supply and discharge of a fluid into and out from the first actuator, a first mode switching valve having a drive mode position and a follower mode position in a fluid circuit of the first actuator, and a main switching signal device for controlling a switching position of the first mode switching valve, the second actuator including a second controlled valve for controlling a supply and discharge of a fluid into/from the second actuator, a second mode switching valve having a drive mode position and a follower mode position in a fluid circuit of the second actuator, and a first switching signal device for controlling a switching position of the second mode switching valve, the second actuator further including a second switching signal device other than the first switching signal device for controlling the second mode switching valve, the first control unit further including a follower signal generating part which generates a follower signal by which the second actuator is followed with the wing, the follower signal generating part sending the follower signal to the second switching signal device, and the second switching signal device being adapted to switch the position of the second mode switching mode valve to the follower mode position in accordance with the follower signal regardless of the status of the first switching signal device, so that the second actuator is followed with actuation of the wing.

2. A wing driving apparatus according to claim 1, further comprising:

(e) a detector part for detecting as to whether or not the second drive controller part is able to operate the second actuator to drive the wing when the first drive controller part operates the first actuator to drive the wing.

* * * * *